United States Patent Office.

GEORGE E. SWAN, OF MOUNT VERNON, OHIO.

Letters Patent No. 112,509, dated March 7, 1871.

IMPROVEMENT IN MEDICAL COMPOUNDS FOR TREATING FEVER AND AGUE.

The Schedule referred to in these Letters Patent and making part of the same.

*To all whom it may concern:*

Be it known that I, GEORGE E. SWAN, of Mount Vernon, in the county of Knox and State of Ohio, have invented a new and valuable Improvement in "Medical Compounds;" and I do hereby declare that the following is a full, clear, and exact description of the composition of the same.

My invention has relation to medical compounds, and consists in compounding and mixing together the ingredients, and in the proportions hereinafter mentioned, intended to serve as an efficient remedy for the disease known as fever and ague.

The ingredients and proportions are as follows:

Quinine, one ounce; capsicum annuum, five drams; calomel, forty-eight grains; sulphuric acid, one dram; charcoal, two drams; santonine, thirty-two grains; gum arabic mucilage of quantities sufficient to make the entire mixture of the proper consistency.

The method of compounding this mixture is as follows:

I first take the quinine and cut it by pouring on the sulphuric acid; I then add the capsicum annuum, the calomel, and santonine, and mix thoroughly, adding in the meantime the solution of gum arabic and the charcoal. I mix the entire compound thoroughly together until it is reduced to the proper consistency. I then make them into pills, making in all three hundred and twenty pills of three grains each.

Having thus explained my compound,

What I claim, and desire to secure by Letters Patent, is—

The medical compound herein described, compounded in the manner, proportions, and for the purpose specified.

In testimony that I claim the above I have hereunto subscribed my name in the presence of two witnesses.

GEORGE E. SWAN.

Witnesses:
T. S. PARKE,
H. L. GREBE.